United States Patent [19]

Matthes et al.

[11] Patent Number: 4,549,256

[45] Date of Patent: Oct. 22, 1985

[54] INVERTER ARCING CONTROL FOR A PARALLEL-RESONANT CIRCUIT STATIC FREQUENCY CHANGER

[75] Inventors: Hans G. Matthes, Wermelskirchen; Hasso Wittenbecher, Remscheid, both of Fed. Rep. of Germany

[73] Assignee: AEG-Elotherm, Fed. Rep. of Germany

[21] Appl. No.: 541,258

[22] Filed: Oct. 12, 1983

[30] Foreign Application Priority Data

Oct. 12, 1982 [DE] Fed. Rep. of Germany ....... 3237716

[51] Int. Cl.[4] .................... H02P 13/20; H02M 7/515; H02M 1/18
[52] U.S. Cl. ...................... 363/39; 363/37; 363/98; 363/136
[58] Field of Search ....................... 363/35, 37, 51, 96, 363/135, 136, 39, 98, 40

[56] References Cited

U.S. PATENT DOCUMENTS 3,942,090  3/1976  Matthes et al. ...................... 363/37
4,066,954  1/1978  Vukasovic et al. ..................... 363/37
4,330,717  5/1982  Coleman ................................ 363/96

*Primary Examiner*—Peter S. Wong
*Assistant Examiner*—D. L. Rebsch
*Attorney, Agent, or Firm*—Cushman, Darby & Cushman

[57] ABSTRACT

An inverter circuit with a thyristor bridge circuit, a load circuit developed as a parallel oscillating circuit connected to the bridge circuit, an impulse generating circuit for supplying ignition pulses to the bridge circuit and an arcing time regulating circuit for controlling the impulse generating circuit in accordance with the arcing time. A down-and-up integrating circuit is triggered by an ignition impulse to integrate down until a discriminator circuit produces a signal indicating zero crossover of the load current, thereafter to integrate up until a second discriminator produces a second signal indicating zero crossover of the load voltage, at which time the integrator output indicates arcing time, and is applied to the time regulating circuit to control the impulse generating circuit.

1 Claim, 4 Drawing Figures

INVERTER ARCING CONTROL FOR A PARALLEL-RESONANT CIRCUIT STATIC FREQUENCY CHANGER

The invention relates to an inverter made of thyristors disposed in a bridge with a load circuit developed as a parallel resonant circuit and an arcing time regulating circuit for the thyristors.

Inverters of this type are known, and are used most often in static frequency changers. In such static frequency changers, the multiphase AC current is rectified in a thyristor rectifier consisting of several branches, and is fed by way of a smoothing choke to the inverter. For commutation, it is necessary to operate the inverter with a frequency which is higher than the resonance frequency of the load circuit developed as a parallel resonant circuit, because only under this condition will it be possible to maintain the characteristic minimum thyristor arcing time for the thyristors. The arcing time, on the one hand, is greatest near the resonance frequency. On the other hand, the inverter voltage determining the performance of the inverter drops as the inverter frequency deviates from the resonance frequency to higher frequencies. Therefore, the inverter should be operated, as much as possible, in a state in which the arcing time deviates only little from the minimum arcing time.

In order to achieve this goal, an arcing time-regulating circuit is often added to the ignition impulse generator delivering the ignition impulses to the thyristors. Such a regulating circuit controls the actual value for the arcing time from the time of the negative voltage lobe of the thyristor voltage. Insofar as the arcing-time-regulating circuit controls the ignition impulse-generator exactly in accordance with this actual value, there is no guarantee that the thyristors are operated with the maximum possible performance, because the time of the negative voltage lobe is less than the actual arcing time. Furthermore, it is a disadvantage that the voltage lobe adduced for the determination of the actual value in the case of a small thyristor voltage has too small an interference voltage distance.

The object of the present invention is an inverter in which the actual arcing time value will be determined exactly for arcing time regulation.

According to the invention, linear integration is initiated from the ignition signal of a commutating diagonal of the bridge circuit current delivered to the thyristor. At the zero crossover of the current in this diagonal, the integration is inverted, whereby the absolute value of the integration is maintained and the integration is stopped at the zero crossover point of the voltage of the diagonal. The integration value at the end of the integration is fed to the arcing time regulating circuit as the actual arcing value.

In contrast to past techniques, the signals for the determination of the actual time are not derived directly from a thyristor but from the load circuit. By absolute value integration with positive and subsequently negative integration, the zero crossover of the current in the thyristors of the diagonal can be exactly obtained. As a result of the linear integration starting from this zero crossover up to the zero crossover of the voltage in the load circuit, a precise actual value for the arcing time is obtained.

In the following detailed description of the drawing, the invention will be explained in more detail on the basis of drawings in which.

Figure 1:
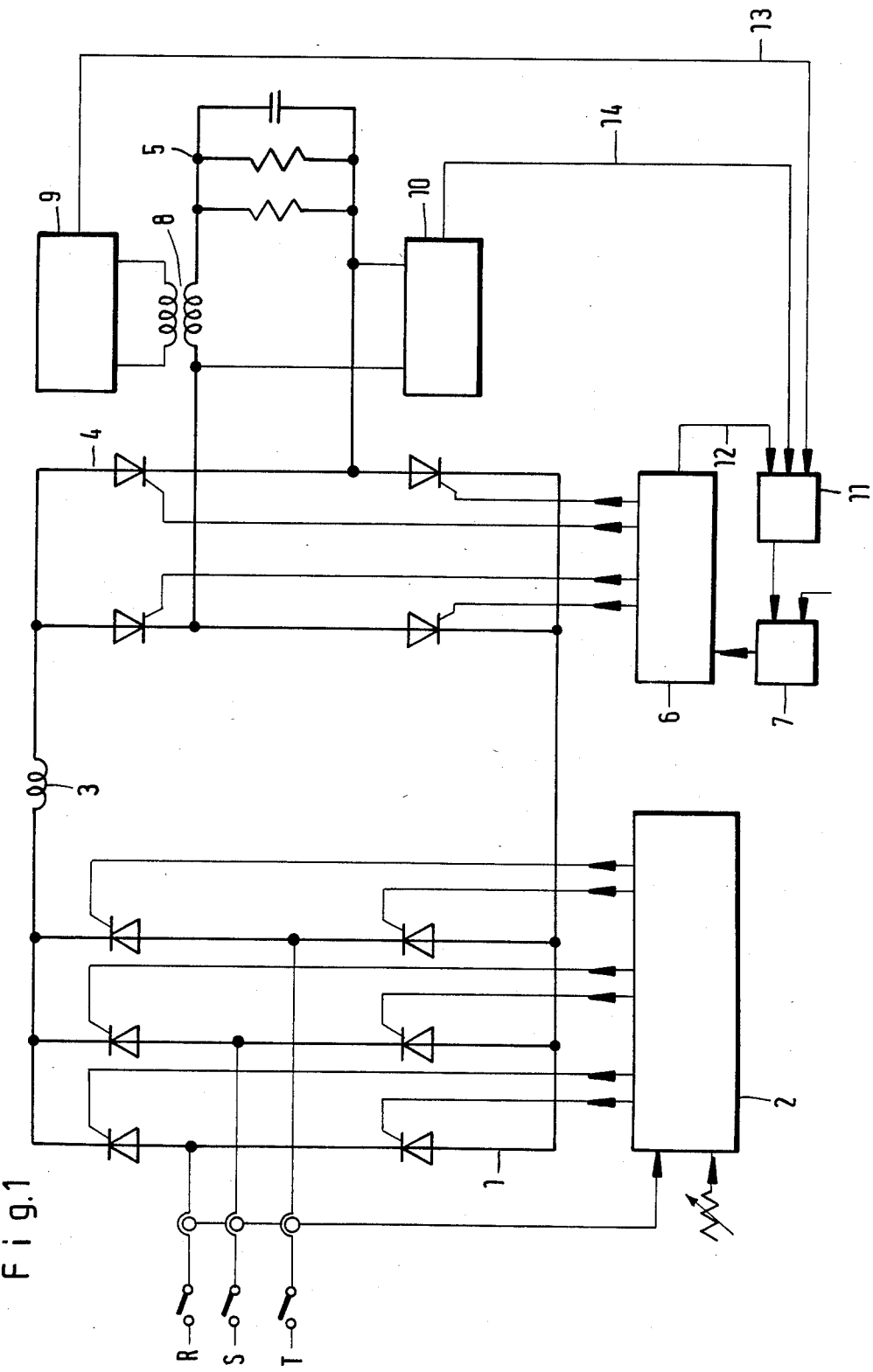
FIG. 1 shows a circuit diagram of a parallel resonant circuit static frequency changer according to the present invention.

FIG. 1 shows a parallel-resonant circuit static frequency changer consisting of a rectifier 1 fed from a three-phase current network. A current-and-voltage regulating circuit 2, a smoothing choke 3 and an inverter circuit 4 are connected to rectifier 1. Rectifier 1, as well as inverter circuit 4, are made up of conventional thyristors.

A load circuit 5 developed as a parallel resonant circuit is connected to the bridge circuit of the inverter 4 in such a way that the load circuit 5 is fed alternately with current from the diagonals of the inverter circuit 4. Ignition impulses fed to the ignition electrodes of the inverter 4 are delivered by the ignition impulse generator 6, which is conventionally controlled by an arcing-time-regulating circuit 7.

Figure 3:
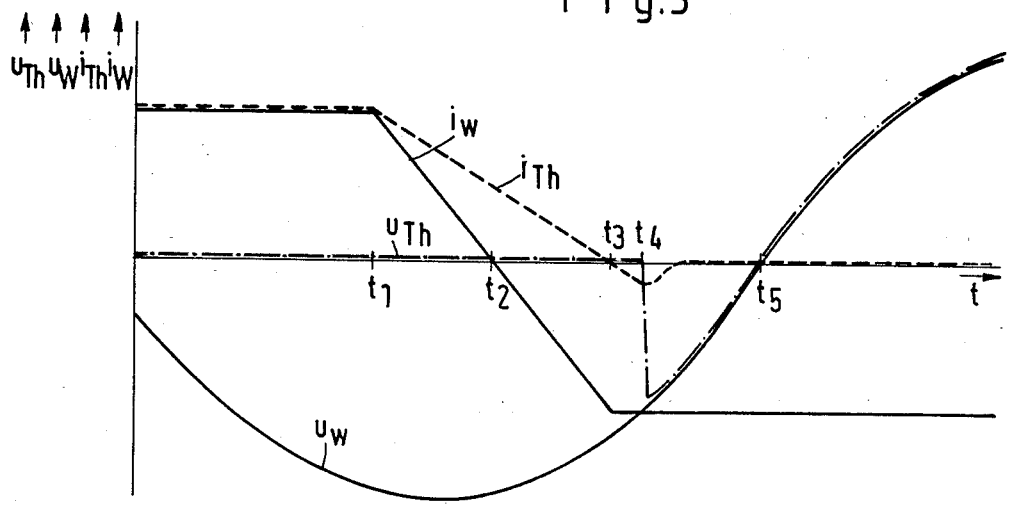
FIG. 3 is a diagram for the current and voltage in a diagonal of the inverter or in the load circuit.
Figure 4:
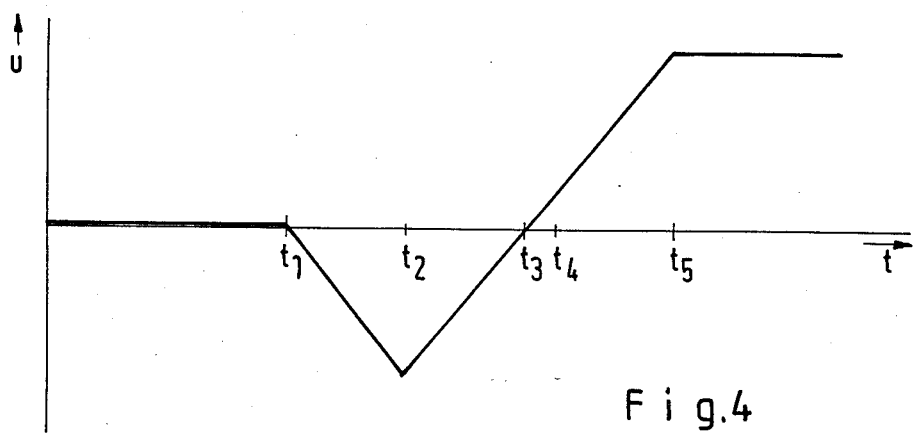
FIG. 4 is a voltage diagram for the integrator.

The trapezoid-shaped frequency current $i_w$ of FIG. 3 in the load circuit 5 is fed by way of a current transformer 8 to a discriminator 9, which at the zero crossover point of the current $i_w$ delivers a control impulse at its output. An additional discriminator 10 is connected to the load circuit 5, for determining the zero voltage point of the sinusoidal frequency voltage $u_w$ and delivering a control impulse at the zero crossover point of the voltage $u_w$ of load circuit 5. These control impulses and a control impulse derived from the ignition impulses delivered to the thyristors of the inverter 4 are fed to an integrator 11 for linear down-and-up integration. The integrator 11 produces the actual value signal for the arcing time to the arcing time regulating circuit 7. Moreover, the arcing time regulating circuit 7 determines a theoretical value signal.

Figure 2:
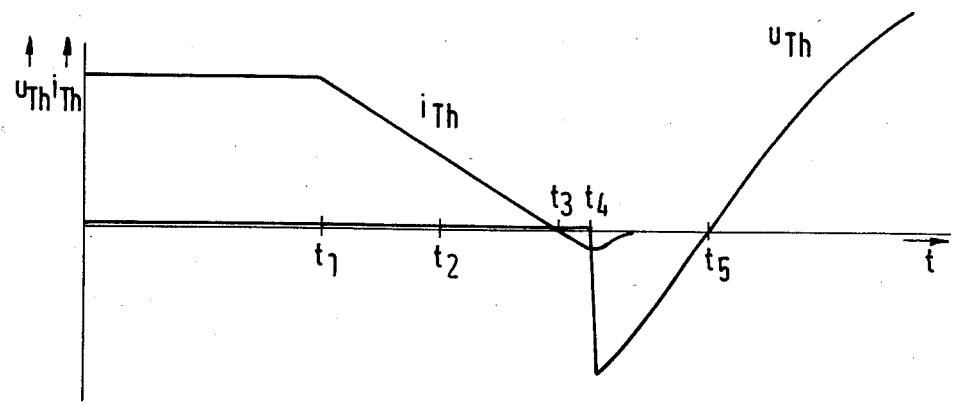
FIG. 2 shows a diagram for the current and voltage of a thyristor during static frequency changer operation.

FIG. 2 shows the current and voltage for a thyristor. In the time up to $t_1$, the thyristor conducts. The voltage at the thyristor at this time is obviously zero. At time $t_2$, an ignition impulse is delivered to the thyristors of the counter-diagonal from the ignition impulse generator 6. The current $i_{Th}$ in the thyristor drops at time $t_3$ to a negative value and then back to zero. The voltage $u_{Th}$ at the thyristor and up to time $t_4$ is zero. At $t_4$, $u_{Th}$ jumps to a maximum negative value and then rises sinusoidally into the positive. The zero point crossover of voltage $u_{Th}$ occurs at $t_5$.

In FIG. 3, the current $i_{TH}$ of a thyristor and the pertinent voltage $u_{Th}$ are shown once more in a broken or in a dash-dot line in order to clarify the temporal connection with the current $i_w$ that is to be measured and of the voltage $u_w$ that is to be measured in the load circuit 5. The current $i_w$ and the voltage $u_w$ in the load circuit are shown in solid lines.

As is evident from FIG. 3, the zero crossover point of the current $i_{Th}$ at the time $t_3$, which determines the arcing time $t_3$ to $t_5$, may not be determined directly by measurement of the inverter current $i_w$ and/or of the inverter voltage $u_w$, because neither this current $i_w$ nor this voltage $u_w$ has any distinct changes at this point in time, such as zero crossover. Nevertheless, according to the present invention, time $t_3$ may be determined exactly. The currents $i_{Th}$ and $i_w$, in the thyristors of a diagonal and in the load circuit 5, are linear. However, the slope of the current $i_w$ in the load circuit is twice as great as the slope of the thyristor current $i_{Th}$. Finally, time $t_3$ coincides with the end of the current $i_w$ in the load circuit. This means that time $t_3$ for the zero crossover point of the thyristor current $i_{Th}$ and thus also for the end of the recommutation is twice as far removed from time $t_1$ of the beginning of the recommutation, introduced by the ignition impulses as time $t_2$. This time $t_2$ can easily be determined by measuring the load circuit 5.

The determination of the arcing time $t_3$ to $t_5$ in application of this recognized connection is accomplished in such a way that an impulse derived from an ignition impulse of the ignition impulse generator 6 by way of a line 12 is applied to the integrator 11 as a starting signal for the integration in the negative (down) direction. This integration takes place with a constant integrator, as soon as the discriminator 9 at the time $t_2$ determines the zero crossover of the current $i_w$ in the load circuit 5. The integrator 11 receives an impulse by way of line 13 for the reversal of the integration in a positive (up) voltage direction. The absolute value of the integration speed will at the same time be maintained. This integration is stopped by means of an impulse $t_5$ delivered by the discriminator 10 via line 14, whenever the discriminator 10 determines the zero crossover of the voltage at the load circuit. The zero crossover of the voltage of the integrator 11 at time $t_3$ corresponds, because of the linear down-and-up integration, exactly to the zero crossover of the current $i_{Th}$ in the thyristor, so that the voltage value increased from the zero passage $t_3$ to the end $t_5$ of the integration corresponds exactly to the actual arcing time of the thyristor. This voltage signal reaches the arcing time regulating circuit 7 as an actual value signal.

This kind of determination of the arcing time in a diagonal is carried out either from half period to half period or by way of several half periods, whereby the average of the actual values serves as a theoretical value to carry out a change of the ignition impulse sequence frequency.

Many changes and modifications can of course be carried out without departing from the scope of the present invention, such scope intended only to be limited by the scope of the appended claim.

What is claimed is:

1. An inverter circuit comprising:
    a bridge circuit formed of thyristors;
    a load circuit developed as a parallel oscillating circuit connected to said bridge circuit;
    an impulse generating circuit for supplying ignition impulses to said bridge circuit;
    first discriminator circuit means for detecting the zero crossover point of the current $i_w$ of the load circuit and producing a first signal;
    second discriminator circuit means for detecting the zero crossover point of the voltage $u_w$ of the load circuit and producing a second signal;
    an up-and-down integrating circuit means for integrating in a first direction following production of an ignition pulse, integrating in the opposite direction at production of said first signal and terminating integration at production of said second signal to produce an output signal indicating arcing time at production of said second signal; and
    an arcing time regulating circuit for controlling said impulse generating circuit in accordance with the output signal of said integrating circuit means.

* * * * *